United States Patent
Ramesh et al.

(10) Patent No.: US 8,526,305 B2
(45) Date of Patent: Sep. 3, 2013

(54) SYSTEM AND METHODS FOR REDUCING POWER CONSUMED BY A BASE STATION

(75) Inventors: Rajaram Ramesh, Raleigh, NC (US); Kumar Balachandran, Pleasanton, CA (US); Havish Koorapaty, Saratoga, CA (US); Stephen Grant, Pleasanton, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 968 days.

(21) Appl. No.: 12/548,045

(22) Filed: Aug. 26, 2009

(65) Prior Publication Data

US 2011/0051640 A1 Mar. 3, 2011

(51) Int. Cl.
*H04J 1/16* (2006.01)

(52) U.S. Cl.
USPC .................... 370/230; 370/331; 455/436

(58) Field of Classification Search
USPC .............. 370/310.2, 315, 322, 328, 330, 338, 370/343, 401, 535; 455/436, 437, 438, 439, 455/440, 441, 442, 443, 505, 515, 524, 525, 455/526
See application file for complete search history.

(56) References Cited

U.S. PATENT DOCUMENTS

| 6,330,459 | B1 | 12/2001 | Crichton et al. | |
|---|---|---|---|---|
| 6,360,106 | B1 * | 3/2002 | Besson | 455/561 |
| 2002/0037732 | A1 | 3/2002 | Gous et al. | |
| 2004/0063455 | A1 * | 4/2004 | Eran et al. | 455/525 |
| 2007/0021122 | A1 | 1/2007 | Lane et al. | |
| 2009/0040954 | A1 | 2/2009 | Usuba | |
| 2009/0054055 | A1 * | 2/2009 | Iwamura et al. | 455/423 |
| 2012/0014344 | A1 * | 1/2012 | Yu et al. | 370/329 |

FOREIGN PATENT DOCUMENTS

| WO | WO 2004/054153 A2 | 6/2004 |
|---|---|---|
| WO | WO 2004/075583 A1 | 9/2004 |
| WO | WO 2009/077893 A1 | 6/2009 |

* cited by examiner

*Primary Examiner* — Huy D. Vu
*Assistant Examiner* — Dady Chery

(57) ABSTRACT

The present invention provides systems and methods that enable a base station to consume less power. According to an embodiment of the invention, the base station reduces its power consumption by not continuously broadcasting control information. In such an embodiment, a mobile station that seeks access to a network to which the base station provides access does not search for broadcast control information prior to transmitting an access message to the base station, but rather simply transmits on a predetermined access channel an access request message. A base station that receives the access request message may unicast control information to the mobile station.

24 Claims, 11 Drawing Sheets

SYSTEM AND METHODS FOR REDUCING POWER CONSUMED BY A BASE STATION

TECHNICAL FIELD

The present disclosure relates generally to the field of communications, and more specifically to techniques for saving power in a wireless communication system.

BACKGROUND

In wireless communication systems a mobile station (e.g., mobile phone or other device capable of wireless communication) typically accesses a network via a base station. In some wireless communication systems, as is well known in the art, in order for a mobile station to transmit user data to (and receive user data from) a base station, the mobile station must first obtain certain control information from the base station. This certain control information may include: a synchronization signal, pilot information and/or one or more control messages that contain information about the base station and/or the network to which the base station belongs.

In some systems, the base stations are configured to broadcast this control information on a continuous basis. For example, a conventional Long Term Evolution (LTE) base station broadcasts control information about every 5 milliseconds, a conventional GSM base station broadcasts control information about every 50 milliseconds, a conventional WCDMA base station broadcasts synchronization information about every 10 milliseconds and pilot information continuously, a WiMAX base station transmits control information every 5 ms, and a conventional CDMA base station broadcasts control information continuously. After receiving the broadcast control information from one or more of the base stations, the mobile station transmits an access message to a selected one of the base station (e.g., the closest base station or the base station having the strongest signal) in order to obtain network access. A problem with such existing systems is that the broadcasting of the control information on a continuous basis consumes a significant amount of power. What is desired, therefore, are systems and method for reducing the amount of power consumed by a base station.

SUMMARY

It is an object of the present invention to provide systems and methods that enable a base station to consume less power. According to an embodiment of the invention, the base station reduces its power consumption by causing the base station to operate in a discontinuous mode of operation, rather than a continuous mode of operation. In the continuous mode of operation the base station transmits control information on a frequent basis, as described above in the background section. In the discontinuous mode of operation, the transmitter broadcasts control information on a much more infrequent basis (or not at all) (i.e., on a duty cycle low enough that a mobile station may not be able to rely on such information being present). For example, in embodiments where the base station is a GSM base station, the base station when operating in the discontinuous mode of operation may broadcast control information only every 110 ms or at a slower rate (or not at all). As another example, in embodiments where the base station is a WiMAX base station, the base station when operating in the discontinuous mode of operation may broadcast control information only every 50 ms or at a slower rate (or not at all). Accordingly, in some embodiments, a mobile station that seeks access to the network does not search for broadcast control information prior to transmitting an access message, but rather simply transmits an access request message on a predetermined access channel. A base station that receives the access request message may unicast control information to the mobile station. For example, in some embodiments, a base station that receives the access request message and determines that it is the closest base station to the mobile station, will transmit the control information to the mobile station. The mobile station may then use the control information to further establish communication with the base station and, thereby, gain access to the network.

Advantageously, in some embodiments, the mobile station is configured such that it will transmit an access request message only within predetermined windows of time (e.g., at predetermined points or within certain intervals in time). By configuring the mobile station in this manner, a base station need search for access request messages only during these predetermined windows of time, rather than continuously, thereby further reducing the power consumed by the base station. Accordingly, in some embodiments, when the base station is configured to operate in the discontinuous mode of operation, a base station receiver is activated on a discontinuous basis. That is, the receiver is operated such that the receiver is active only during certain predetermined time periods. In such embodiments, it is important that the mobile stations and the base stations either both know the correct time (e.g., both the base station and mobile station have highly accurate atomic clocks that are synchronized) or both receive time information from the same adjunct timing system (such as the Global Positioning System (GPS)). For example, if the mobile station is configured such that it will transmit an access request message only at times T, T+1×, T+2×, T+3×, . . . , then both the mobile station and the base station need to know when these times occur so that the mobile station will know when it should transmit an access request message and so that the base station knows when to scan for an access request message. In some embodiments, the base station scans for an access request message within a time window that is somewhat longer than the length of the access message; this is done in order to allow for variations in arrival times of the access request message due to propagation delays.

Accordingly, in one aspect, the invention provides a method for reducing power consumed by a base station having a transmitter and receiver. In some embodiments, this method includes the following steps: (a) configuring the transmitter such that it transmits control information on a discontinuous basis; (b) configuring the base station in a mode whereby the receiver is activated on a discontinuous basis; and (c) when the receiver is activated, using the receiver to detect an access request message transmitted from a mobile station on an access frequency. In some embodiments, the step of activating the receiver on a discontinuous basis comprises activating the receiver at pre-determined time instants and deactivating the receiver at other pre-determined time instants. The pre-determined time instants may be referenced to a time of day value obtained by the base station from (i) an adjunct timing system or (ii) a local clock that is calibrated using a signal transmitted from an adjunct timing system. In some embodiments, the access request message may include a mobile station identifier associated with the mobile station and/or information identifying the position of the mobile station.

In some embodiments, the method also includes the steps of transmitting, from the base station to the mobile station, a response message comprising control information after detecting the access request message, where the control information contains information that is needed by the mobile station to further communicate with the base station.

In some embodiments, the method also includes the steps of determining the load on the base station; and, if the determined load exceeds a threshold, then continuously broadcasting the control information until the load on the base station falls below a threshold.

In some embodiments, the method also includes the steps of: after detecting the access request message, determining the quality of the access request message; determining whether the determined quality of the access request message exceeds a threshold; and in response to determining that the quality exceeds the threshold, transmitting from the base station to the mobile station, a response message comprising control information, wherein the control information contains information that is needed by the mobile station to further communicate with the base station. In other embodiments, the method also includes the steps of: after detecting the access request message, determining the quality of the access request message; transmitting, from the base station to a radio network controller, a control message indicating the quality of the access request message; receiving from the radio network controller a command message sent in response to the control message; and in response to receiving the command message, transmitting from the base station to the mobile station, a response message comprising control information, wherein the control information contains information that is needed by the mobile station to further communicate with the base station.

In some embodiments, after the base station detects the access request message, the base station determines whether it or one of a set of neighboring base stations is the best base station to respond to the access request message. If the base station determines that it is the best base station to respond, then the base station may activate a transmitter and use the transmitter to transmit to the mobile station a response message to the access request message. The response message preferably contains control information that is needed by the mobile station to further communicate with the base station. In some embodiments, the base station randomly chooses a time instant from a pre-determined set of time instants, and the step of transmitting the response message comprises transmitting the response message at the randomly chosen time instant. In some embodiments, after transmitting the response message to the mobile station, the base station transmits to a neighboring base station a command to send measurement signals to the mobile station.

In some embodiments, after deactivating the receiver, the base station determines the amount of time that has elapsed since the receiver was deactivated (or the receiver was last activated before being deactivated) and determines whether the determined amount of elapsed time equals or substantially equals a predetermined amount of time. If the determined amount of elapsed time equals or substantially equals the predetermined amount of time, then the base station activates the receiver. After the receiver is activated, the base station determines the amount of time that has elapsed since the receiver was activated and determines whether the determined amount of elapsed time equals (or substantially equals) a predetermined amount of time. If the determined amount of elapsed time equals (or substantially equals) the predetermined amount of time, then the base station deactivates the receiver once again. In some embodiments, the step of determining the amount of time that has elapsed comprises receiving a signal from an adjunct timing system located remotely from the base station. The signal from the adjunct system may be used to determine the time of day, and also be used as a reference to adjust a local clock (e.g., local oscillator) at the base station. The base station may use the local clock to determine if an elapsed time is equal to a pre-determined amount of time. In the above manner, the receiver is activated at pre-determined times and de-activated at pre-determined times so that power is conserved.

In another aspect, the invention provides a method performed by a mobile station. In some embodiments, the method begins with the mobile station generating an access request message to be sent on an access frequency. Next, the mobile station sends the access request message at a pre-determined time instant referenced to a time of day value obtained from an adjunct timing system. In some embodiments, the method also includes: determining a time of day value using a signal from an adjunct timing system; and determining the pre-determined time instant using an elapsed time from the time of day value, wherein the elapsed time is calculated using a timer at the mobile station. In some embodiments, the method also includes: determining the location of the mobile station using a locating system; and selecting an access frequency based on the determined location of the mobile station, wherein the step of sending the access request message comprises sending the access request message using the selected access frequency. In some embodiments, the step of selecting an access frequency comprises using information indicating the determined location of the mobile station to retrieve from a database information identifying an access frequency. The step of determining the location of the mobile station may include receiving a plurality of signals from a plurality of global positioning satellites.

In some embodiments, the mobile station first searches for a broadcast control message comprising control information. If it finds a broadcast control signal, it may transmit an access signal at a time referenced to the reception of the broadcast control signal. If a broadcast control signal is not found, the mobile station transmits the access request message at a time referenced to a time of day determined from a source other than the base station.

In another aspect, the invention provides a method performed by a radio network controller (RNC). In some embodiments, the method begins with the RNC receiving, from each one of a set of base stations, a control message sent by the base station in response to the base station receiving an access request message from a mobile station. After receiving the control messages, the RNC selects a base station from the set of base stations, wherein the selection is based on, at least in part, the location of the base stations and/or the location of the mobile station received by the base stations and/or the quality of the access request messages received by the base stations. After selecting the base station, the RNC transmits to the base station a command message that causes the base station to transmit to the mobile station a response message comprising control information. It is to be noted that the RNC as discussed is a logical function and that the abilities of that function may be implemented in other ways, such as within an anchor base station or alternative site for radio network control.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

As used herein the articles "a" and "an" mean "one or more."

Figure 1:
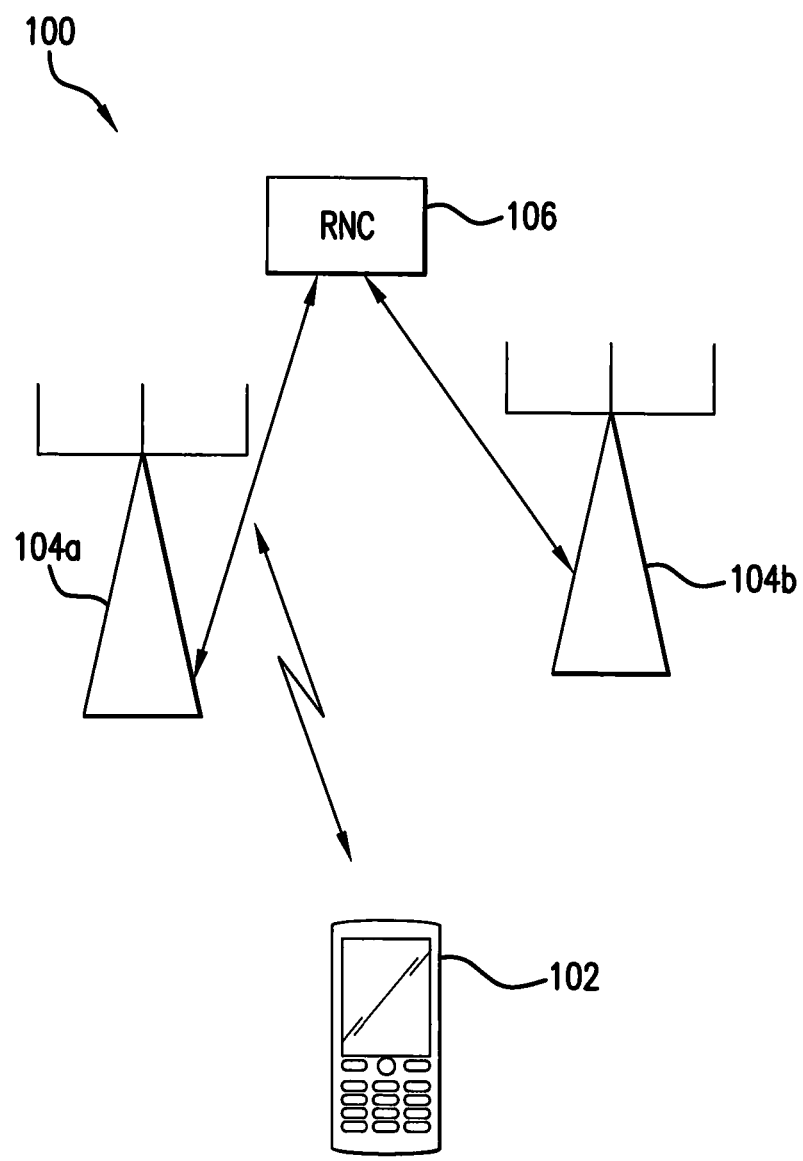
FIG. 1 illustrates components of a wireless communication system.
Figure 2:
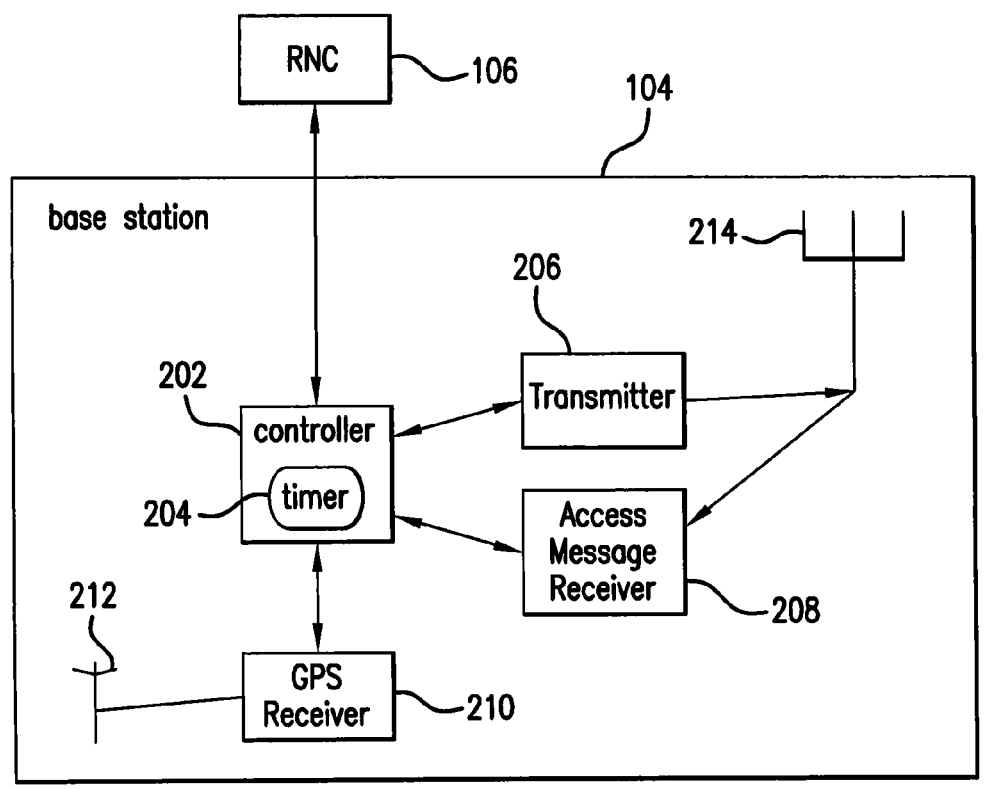
FIG. 2 is a functional block diagram of a representative base station according to some embodiments of the invention.

Referring now to FIG. 1, FIG. 1 illustrates components of a wireless communication system 100 according to some embodiments of the invention. As illustrated in FIG. 1, system 100 may comprise multiple base stations 104 (e.g., base station 104a and base station 104b), a mobile station 102, and a radio network controller 106, which is in communication with base stations 104. In other embodiments, system 100 does not have an RNC 106 because the functionality of RNC 106 may be implemented in base stations 104, thereby obviating RNC 106. Referring now to FIG. 2, FIG. 2 is a functional block diagram showing some components of a representative base station 104 according to some embodiments of the invention. As shown in FIG. 2, base station 104 includes an antenna 214, a transmitter 206 coupled to antenna 214, an access request message receiver 208 coupled to antenna 214, and a controller 202 coupled to transmitter 206 and receiver 208.

As discussed in the Background, in prior art systems, a conventional base station broadcasts control information on a continuous basis. That is, a conventional base station broadcasts control information at a periodicity that is system specific. For example, a mobile WiMAX base station may broadcast control information at least once every 5 ms, and this is known as the continuous mode of operation. This invention defines a new mode (a.k.a., the discontinuous mode) where such control information is transmitted at a significantly lower relative periodicity or even as a consequence of detecting mobile access transmissions. For example, a WiMAX base station according to an embodiment of the invention that is operating in the discontinuous mode may broadcast such control information only once every 50-100 ms. Accordingly, in some embodiments of the present invention, controller 202 is configured such that it causes base station 104 to broadcast control information on a continuous basis (i.e., to operate in the continuous mode) only when the load on the base station exceeds a threshold (e.g., when, in some given interval of time, the number of mobile stations seeking to utilize the base station exceeds a threshold number). At the other times (i.e., when the load on the base station is below the threshold) controller 202 is configured such that it causes the base station to cease broadcasting control information on a continuous basis (i.e., to enter the discontinuous mode), thereby saving power when the load on the base station is, for example, low. For instance, when the load on the base station is below the threshold, controller 202 may be configured to cause base station 104 to not broadcast the control information at any time or to broadcast the control information periodically at a low duty cycle. That is, controller 202 may be configured to cause base station 104 to operate in the discontinuous mode when the load on the base station is low. Accordingly, in some embodiments, controller 202 may monitor the load on the base station and configure the base station according to the observed load. In some embodiments, the base station may send to each currently served mobile station a "mode switch" notification message whenever the base station switches between the continuous mode of operation and its power saving discontinuous mode of operation. In some embodiments, regardless of the load on the cell, the base station may be configured to operate in the above described power saving discontinuous mode. It should be appreciated by one of ordinary skill in the art that the discontinuous mode significantly reduces power consumption because when base station 104 is in the discontinuous mode, the base station transmits control information less often than when the base station is in the continuous mode.

In some embodiments where base station 104 is configured to operate in the discontinuous mode, mobile station 102 may be configured such that immediately after detecting that control information is needed (e.g., in response to a user of mobile station 102 opening an application that requires network access or activating mobile station 102) mobile station 102 transmits an access request message on a known access channel (or "access frequency") so that the access request message may be received by a neighboring base station 104. In some embodiments, the access request message includes an identifier that uniquely identifies mobile station 102 from among a set of mobile stations. Additionally, the access request message may contain information identifying the location of mobile station 102. For instance, mobile station 102 may have a conventional GPS unit 1020 (see FIG. 10) built-in that has the capability of using the GPS satellites to determine the current time and the position of mobile station 102.

In response to receiving the access request message, base station 104 may transmit to mobile station 102, via a unicast transmission, a response message containing the control information that is needed by mobile station 102 to establish a user-plane connection with base station 104. Accordingly, rather than have the base station 104 push necessary control information to mobile station 102, mobile station 102 pulls (i.e., requests) the necessary control information from base station 102, thereby reducing the power consumed by base station 104 because base station 104 need not continuously transmit its control information. As described above, in some embodiments the access request message may contain a mobile station identifier that uniquely identifies the mobile station. In such embodiments, the response message should contain the mobile identifier or a value derived from the mobile identifier.

It is possible that many base stations may receive and respond to a particular access request message transmitted from mobile station 102. In order to prevent the multiple base station responses from colliding with each other, a randomization procedure may be used by the base stations to randomly determine the time at which a response to the mobile station may be sent. For example, a base station that receives an access request message may generate a random number (e.g, a pseudo-random number or a true random number) in response to receiving the request message, set a timer to expire at a point in time that is a function of the generated random number, and then send the response message in response to expiration of the timer. In this way, collisions may be avoided.

In another embodiment, collisions may be avoided by having a central authority (e.g., RNC 106) select the base station that will send the response message. Accordingly, in such an embodiment, a base station that receives an access request message may, in response, transmit a control message to the central authority. Thus, if multiple base stations receive the same access request message, the central authority will receive multiple control messages (one from each base station). In response to receiving the multiple control messages, the central authority can select one of the multiple base stations and then transmit to the selected base station a command message instructing the selected base station to transmit the response message to the mobile station. To facilitate intelligent selection of the base station by the central authority, each base station that receives the access request message determines the quality of the message (e.g., the strength of the signal that carried the message, the fidelity of the message, etc.) and includes in the control message information indicating the determined quality of the access request message. Presumably, for some base stations that receive the access request message the quality of the message will be greater than the quality of the message as received by other base stations. The central authority may use the quality information to select the base station that received the access request message with the greatest quality.

In yet another embodiment, collisions may be avoided by configuring mobile station 102 to include in the access request message an indication of its position and by configuring base stations 104 to calculate the distance between itself and the mobile station as well as, for each of a set of neighboring base stations, the distance between the mobile station and the neighboring base station. The base station 104 that determines that it is the closest base station to mobile station 102 will send the response message. This should reduce collisions as typically only one base station is the closest. Alternatively, a central authority (e.g., RNC 106), that knows the positions of all the base stations, can consider the relative positions of the base stations and the mobile station, in addition to the reported qualities of the access request message received at the set of base stations, to select the best base station from which to send the response message.

As mentioned above, mobile station 102 sends the access request message using a known access frequency. If mobile station 102 receives no response from a base station, mobile station 102 may have to try a different access frequency since the neighboring base stations may not be listening on the first one. With multi-band systems and large numbers of channels, this may impact the synchronization time (e.g., it may significantly increase the amount of time it takes mobile station 102 to receive the necessary control information). This problem can be addressed with an appropriate provisioning of system 100 by the operator. In many embodiments, mobile station 102 includes a SIM module 1022 (see FIG. 10) or a similar memory in the mobile station wherein operator-specific information is stored. It may be advantageous for the SIM module to include a database that associates each of a set of possible access frequency channels with a particular geographic area (e.g., latitude/longitude). Accordingly, in such embodiments, prior to transmitting the access request message, mobile station 102 first obtains information identifying its position (e.g., from GPS unit 1020) and then uses the position information and the database to determine the access frequency channel associated with the position. This feature provides significant flexibility to operators who may own different chunks of spectrum in different areas. It also gives operators the flexibility to choose preferred operators for roaming in other areas where they do not directly provide service. It is also to be appreciated that such a database may be updated by the operator based on on-the-air programming.

In some embodiments, rather than transmitting an access request message immediately after detecting that control information is needed, the mobile station 102 may first scan, for not more than a certain amount of time, a known broadcast channel for control information broadcast by a base station 104. In the event that the mobile station does detect control information from a base station, it shall use normal procedures for accessing the base station, e.g., sending an access request message at a time referenced to the transmission of the broadcast information from the base station. In the event mobile station 102 does not receive control information over the scanned broadcast channel(s), then mobile station 102 will transmit the access request message on a known access channel. In addition, in embodiments where base station 104 enters the discontinuous mode only during low load periods (e.g., embodiments where base station 104 always enters the discontinuous mode between the hours of 21.00 and 6.00), mobile station 102 may be configured such that it knows when base station 104 is in the discontinuous mode and function accordingly. For example, after detecting that control information is needed, the mobile station 102 may first determine whether base station 104 is in a discontinuous mode (or likely to be in a discontinuous mode) by, for example, determining the time of day and determining whether the determined time of day falls within the window of time when base station 104 is expected to be in a discontinuous mode. If the mobile station 102 determines that the base stations 104 in its vicinity are expected to be in a discontinuous mode, then mobile station 102 will immediately transmit the access request message, otherwise mobile station 102 will scan for a control signal. In such an embodiment, base station 104 may broadcast information identifying the window(s) of time during which base station 104 will enter a discontinuous mode so that mobile stations 102 can acquire and store this information for later use.

In a conventional network, the broadcast signal containing the control information is typically used by mobile station 102 to make measurements on neighbor cells, with these measurements being used for handover purposes. In the above described mode where base station 104 transmits control information only when requested by a mobile station 102, there is still a need for one or more neighboring base stations to transmit a signal that can be used by mobile station 102 for handover purposes. Accordingly, in some embodiments of the invention, the serving base station (e.g., base station 104*a*) sends a command message to a neighbor base station (e.g., base station 104*b*) to send measurement signals at specific times, and informs mobile station 102 that such signals will be available for measurement. Alternatively, mobile station 102 or base station 104*a* may request RNC 106 to set up such measurement signals. In some embodiments, the serving base station may use information identifying the location of mobile station 102 and information identifying the location of each of a set of neighboring base stations to select the neighboring base stations to which the serving base station will transmit the command message. For example, the serving base station may be configured to transmit the command message only to those neighboring base stations that are within a certain distance of the mobile station 102.

In embodiments where each base station in a set of neighboring base stations is configured to broadcast periodically a low duty cycle control signal containing control information, it may be advantageous to configure the set of base stations such that each base station transmits the control signal at different times (e.g., in accordance with a reuse pattern). At any given point in time, a mobile station can receive control signals transmitted from multiple base stations. Thus, the staggering of the transmission of the control signal across base stations is expected to lower the amount of time it takes the mobile station to synchronize with a base station. The mode of such staggering may be determined by the nature of the deployment—microcellular or macrocellular. Alternatively, the set of base stations can be configured to send the control signal at the same time, and the resulting macrodiversity may enable the mobile station to lock on to the signal even in disadvantaged locations. In addition, the two modes may also be combined in some fashion—overlapping transmissions at certain times, and non-overlapping at other times in order to achieve good performance under most conditions. Preferably, as described herein, mobile station 102 has a clock that is synchronized with the base stations (or the base stations 104 and mobile stations 102 all receive the same timing signals from an adjunct system, such as GPS) and has knowledge of the duty cycle and signal transmission times so that the mobile station has the information it needs to measure the quality of the signals for the purpose of handover.

As discussed above, significant power savings can be achieved by configuring base station 104 such that base station 104 continuously broadcasts a signal containing control information only when the load on the base station 104 is "high" (e.g., above a predetermined threshold) or, in some embodiments, not at all. That is, significant power savings can be achieved by configuring system 100 such that, at least during certain periods of the day, mobile station 102 pulls necessary control information from a base station 104 rather than having each base station 104 continuously push the control information.

It has been recognized that an even greater power savings can be achieved if mobile station 102 is configured such that it will transmit an access request message only within predetermined windows of time (e.g., at predetermined points or intervals in time). By configuring mobile station 102 in this manner, base station 104 need not search continuously for access request messages. Rather, base station 104 need only search for these messages during predetermined intervals of time, thereby further reducing the power consumed by the base station.

Figure 3:
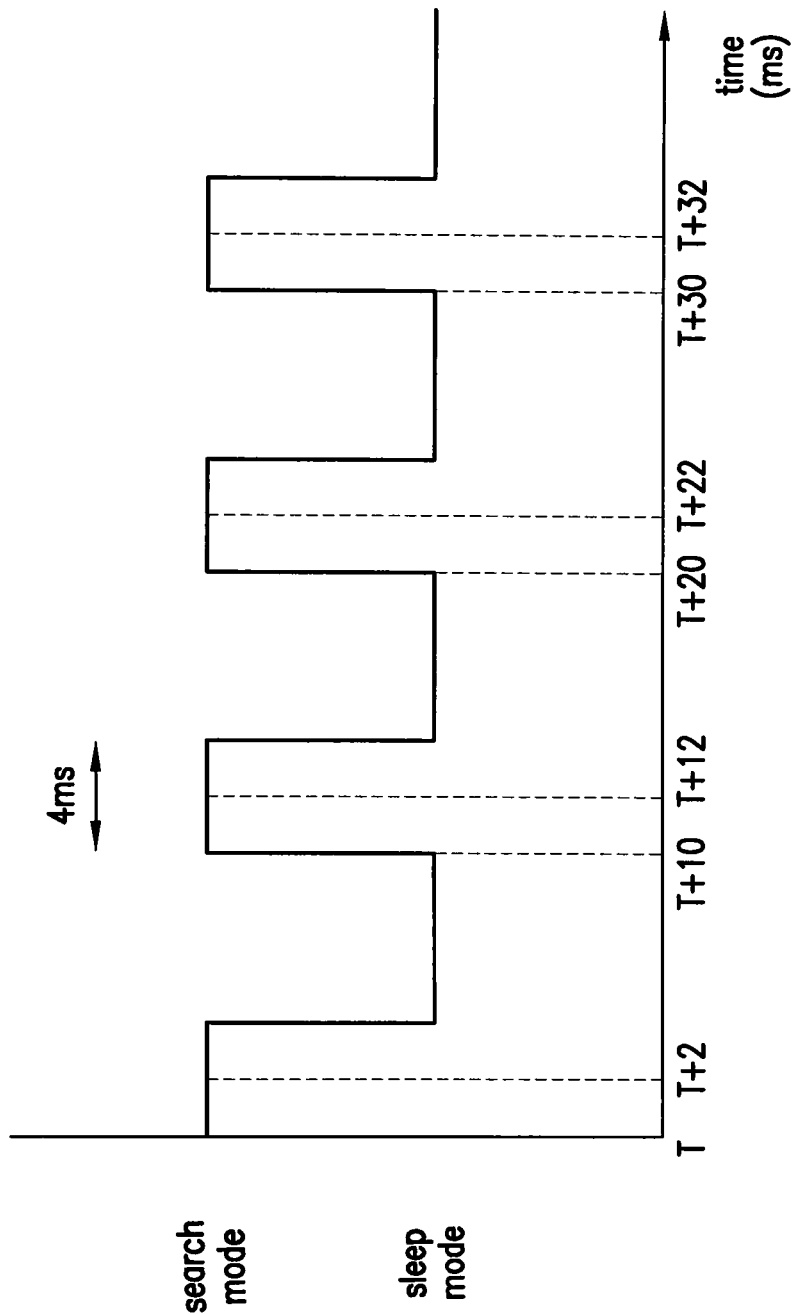
FIG. 3. is a timing diagram showing how the state of a base station receiver oscillates between a sleep mode state and an active state according to some embodiments of the invention.

Referring back to FIG. 2, as mentioned above, base station 102 includes an access message receiver 208 (i.e., a receiver operable to receive and detect access request messages). Referring now to FIG. 3, FIG. 3 is a timing diagram illustrating the operation of receiver 208 according to the embodiment where mobile station 102 is configured such that it will transmit an access request message only within predetermined windows of time. As shown in FIG. 3, receiver 208 has two states: (1) a "search" or "activated" state and (2) a "sleep" or "deactivated" state. While in the "activated" state, receiver 208 is capable of searching (or scanning) for access request messages. That is, for example, while receiver 208 is activated, receiver 208 may compare a block of data that it receives via antenna 214 to a predetermined bit pattern to determine whether the block of data is or contains an access request message. In the deactivated state (a.k.a., sleep state), receiver 208 does not search for access request messages. Because receiver does not search for access request messages in the sleep state, receiver 208 will draw less power (or no power) in the sleep state than in the search state. When receiver 208 is operated as described above (i.e., when receiver 208 alternates between the sleep state and the search state), receiver 208 is said to be activated on a discontinuous basis.

In the example shown in FIG. 3, receiver 208 searches for access message for only 4 ms every 10 ms. Thus, receiver may be in the sleep mode for 60% of time. These are just example figures since the desired the ratio of sleep mode to search mode may depend on many factors. In the example shown in FIG. 3, it is assumed that the mobile stations 102 that desire to communicate with base station 104 are preferably configured to transmit an access request message only at the following times: T+2, T+2+1×10, T+2+2×10, T+2+3×10, etc.

As seen from FIG. 3 and the description above, in the embodiment where mobile station 102 is configured such that it will transmit an access request message only within predetermined windows of time, it is important that mobile station 102 and base stations 104 are synchronized in time so as to ensure that base stations 104 are in the search mode at the times when the mobile station 102 is operable to transmit an access request message. Mobile station 102 and a base station 104 may be synchronized if they both know the correct time (e.g., both the base station 104 and mobile station 102 have highly accurate atomic clocks that have been previously synchronized) or they both obtain time information from the same adjunct timing system (such as the GPS). In a preferred embodiment, mobile station 102 and base stations 104 obtain synchronization through an adjunct system. In one exemplary embodiment, the adjunct system is the GPS. In this embodiment, base station 104 has a GPS receiver 210 and mobile station has a GPS receiver 1020 and both base station 104 and mobile station 102 obtain time information from GPS satellites as is well known in the art. It is to be appreciated that the mobile station and the base station may each have a local clock (e.g., oscillator) that is calibrated using signals received from the GPS satellites. Once such calibration is done, the local oscillators may be used to determine elapsed times for a certain duration until which calibration may have to be done again.

Figure 4:
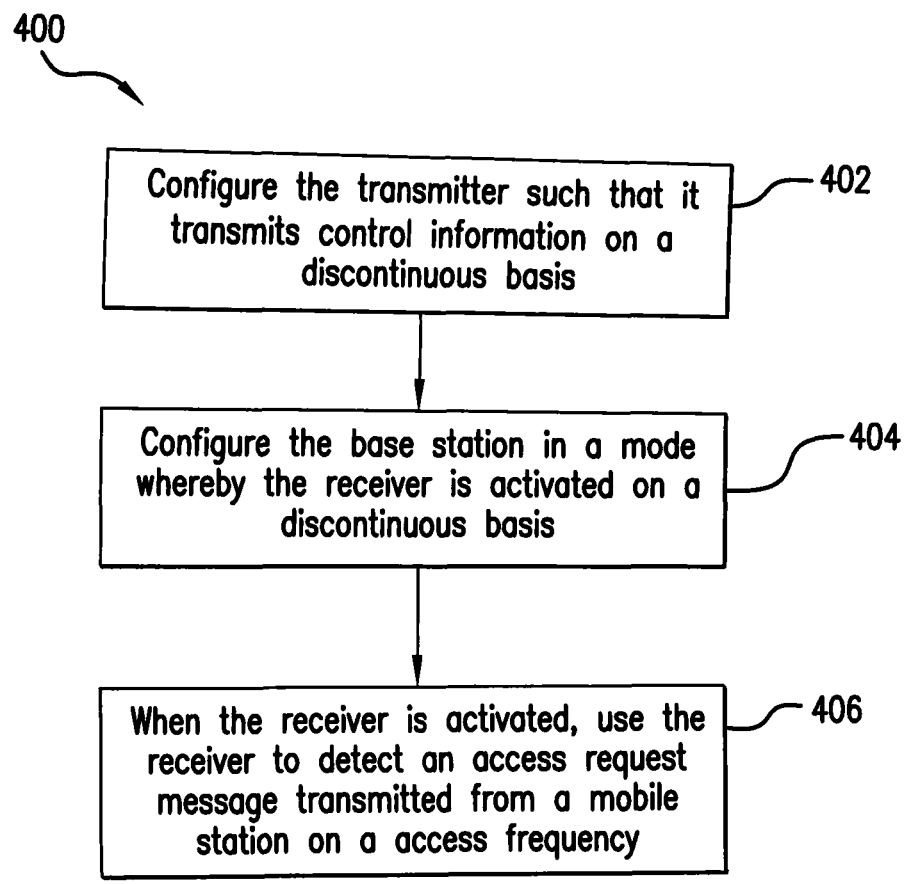
FIG. 4 is a flow chart illustrating a process according to some embodiments of the invention.

Referring now to FIG. 4, FIG. 4 is a flow chart illustrating a process 400, according to an embodiment of the invention, performed by base station 104a (process 400 is preferably also performed by all base stations that neighbor base station 104a, such as base station 104b). Process 400 may begin in step 402, where transmitter 206 is configured such that it transmits control information on a discontinuous basis. For example, controller 202 may control transmitter 206 such that it transmits control information on the discontinuous basis. In step 404, base station 104a is configured in a mode whereby receiver 208 is activated on a discontinuous basis. In step 406, when receiver 208 is activated, the receiver is used to detect access request messages transmitted on an access frequency from mobile stations.

Figure 5:
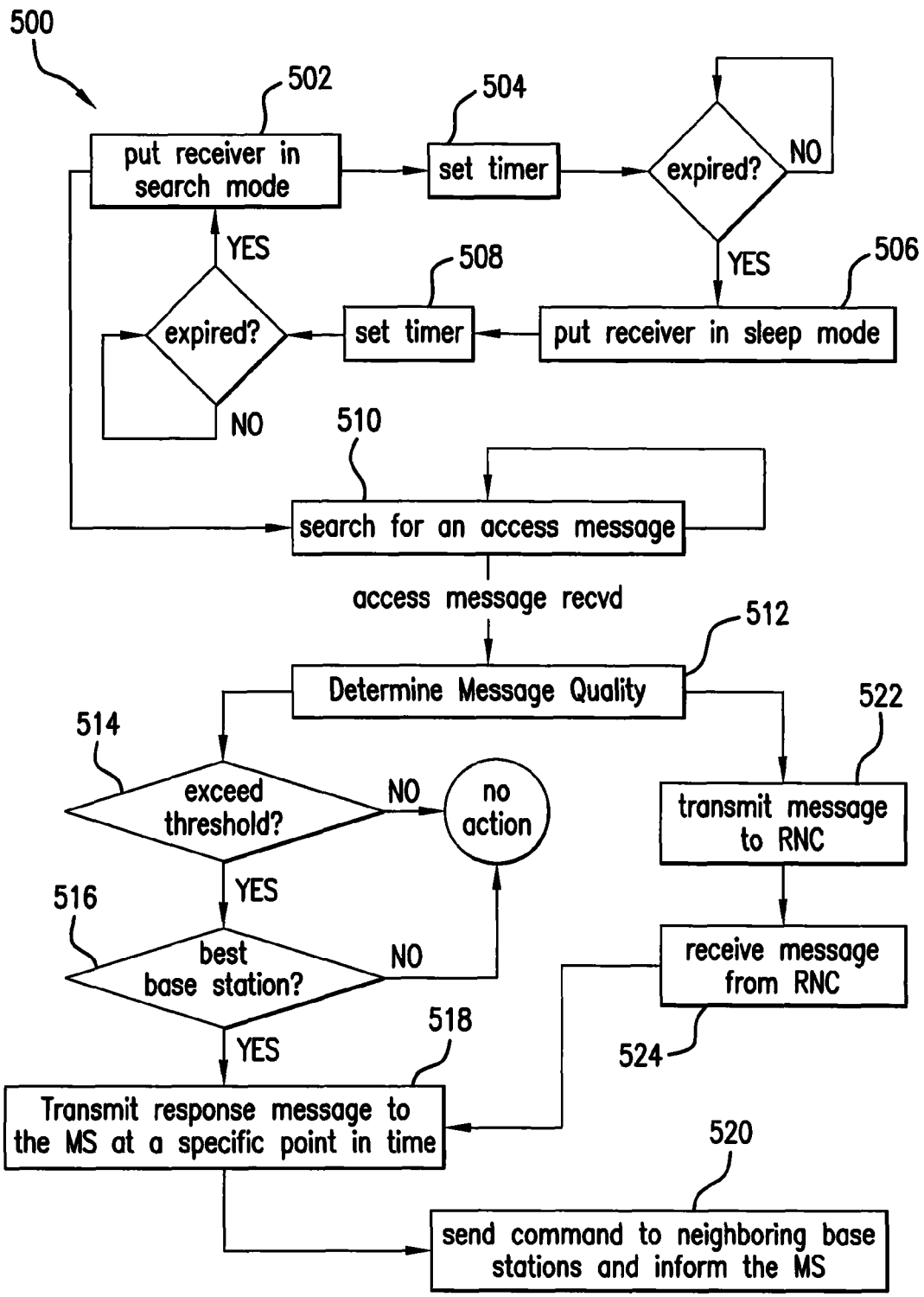
FIG. 5 is a flow chart illustrating a process according to some embodiments of the invention.

Referring now to FIG. 5, FIG. 5 is a flow chart illustrating an example process 500, according to an embodiment of the invention, for implementing process 4—. In this example, process 500 is performed by base station 104a (process 500 is preferably also performed by all base stations that neighbor base station 104a, such as base station 104b). Process 500 may begin in step 502, where controller 202 activates receiver 208 (i.e., causes receiver 208 to enter the above described "search" mode). After step 502, process 500 may proceed to step 504. In step 504, controller 200 sets a timer 204 such that timer 204 will expire after a predetermined time interval (e.g., 4 ms) has elapsed. In some embodiments, the step of setting a timer may consist merely of recording the current time and the step of determining whether the timer has expired may consist merely of determining the current time to determine if the difference between the determined current time and recorded time is greater than or equal to the predetermined time interval.

In response to determining that the timer has expired, process step 506 is performed. In step 506, controller 202 deactivates receiver 208 (i.e., causes receiver 208 to enter the above described "sleep" mode). After step 506, process 500 may proceed to step 508. In step 508, controller sets timer 204 such that timer 204 will expire after a second predetermined amount of time (e.g., 6 ms). In response to the timer expiring, process 500 may return to step 502, where once again receiver 208 is placed into the search mode.

All the while receiver 208 is in the search mode, receiver 208 performs step 510. In step 510, receiver 208 monitors the data it receives via antenna 214 and via a predetermined access frequency channel to determine whether an access request message has been received. When an access request message is received, process 500 may proceed to step 512.

In step 512, controller 202 may determine the quality of the message and/or obtain information about the quality of the message from receiver 208. In one embodiment, after performing step 512, process steps 514 and 516 are preformed, whereas, in an alternative embodiment, process steps 522 and 524 are performed.

In step 514, controller 202 determines whether the quality of the received access request message meets or exceeds a threshold. If it does not, then no further action is performed with respect to the message. The quality may not meet the threshold if, for example, the signal carrying the message is weak (the signal may be weak if the mobile station that transmitted the access request message is far away from the base station or within a windowless room).

In step 516, controller 202 determines whether base station 104a is the "best" base station to respond to the access request message. In some embodiments, the "best" base station is the base station that is closest to the mobile station that transmitted the message and/or the base station that received the highest quality access request message. As discussed above, the access request message may contain information identifying the location of the mobile terminal and base station 104a may have information as to not only its location, but also the location of each neighboring base station (e.g., base station 104b). Accordingly, in some embodiments, controller 202 is equipped with the necessary information to determine whether base station 104a is closer to the mobile station than any of the neighboring base stations. Controller 202 may be configured to determine whether it received the highest quality message by requesting each of the neighboring base stations to report the quality they determined. If controller 202 determines that base station 104a is the "best" base station, the process 500 proceeds to step 518. In some cases, the closest base station may not be the best base station for the mobile station since there may be an obstacle in the path to the closest base station. If determining the "best" base station is based only on the one that is closest to the mobile station, then step 512 and 514 are not needed. Additionally, in some embodiments, step 516 is omitted.

In step 518, controller 202 generates a response message and causes transmitter 206 to transmit the response to the mobile station that transmitted the access request message (e.g., the response may be unicast to the mobile station). The response message includes the requested control information. In embodiments where the access request message includes an identifier associated with the mobile station, this identifier (or value derived from the identifier) may be included in the response message.

In step 522, base station 104a transmits to RNC 106 a control message indicating the determined quality of the access request message. The control message may also include information identifying the position of the mobile station. As process 500 is preferably performed by each neighboring base station, RNC 106 may receive from one or more of the neighboring base stations a similar control message. Thus, because each control message contains, among other things possibly, information identifying the quality of the received access request message, RNC 106 can determine the base station that received the highest quality access request message. Preferably, RNC 106 transmits to the determined base station a command message that causes the base station to perform step 518. If we assume base station 104a is the base station that received the best quality access request message, then after performing step 522, base station 104a will perform step 524 (i.e., base station 104a will receive the command message transmitted by RNC 106. In response to receiving the command message, base station 104a performs step 518.

After performing step 518, step 520 may be performed. In step 520, base station 104a transmits to its neighboring base stations a command that causes each of the base stations to send measurement signals to the mobile station so that the mobile station can facilitate the handover process by determining the quality of the measurement signals.

As discussed above, because multiple base stations (e.g., base stations 104a and 104b) each perform process 500, it is possible that more than one base station may receive and respond to a particular access request message transmitted from mobile station 102. In order to prevent the multiple base station responses from colliding with each other, a randomization procedure may be used by each base station to randomly determine the time at which the response message should be sent. Accordingly, prior to performing step 518, base station 104a may generate a random number in response to receiving the access request message, set a timer to expire at a point in time that is a function of the generated random number, and then perform step 518 in response to expiration of the timer. In this way, collisions may be avoided as the probability that two or more base stations generated the same random number should be small. In the case when the RNC commands only one base station to send an access response message, such randomization may not be required.

Figure 6:
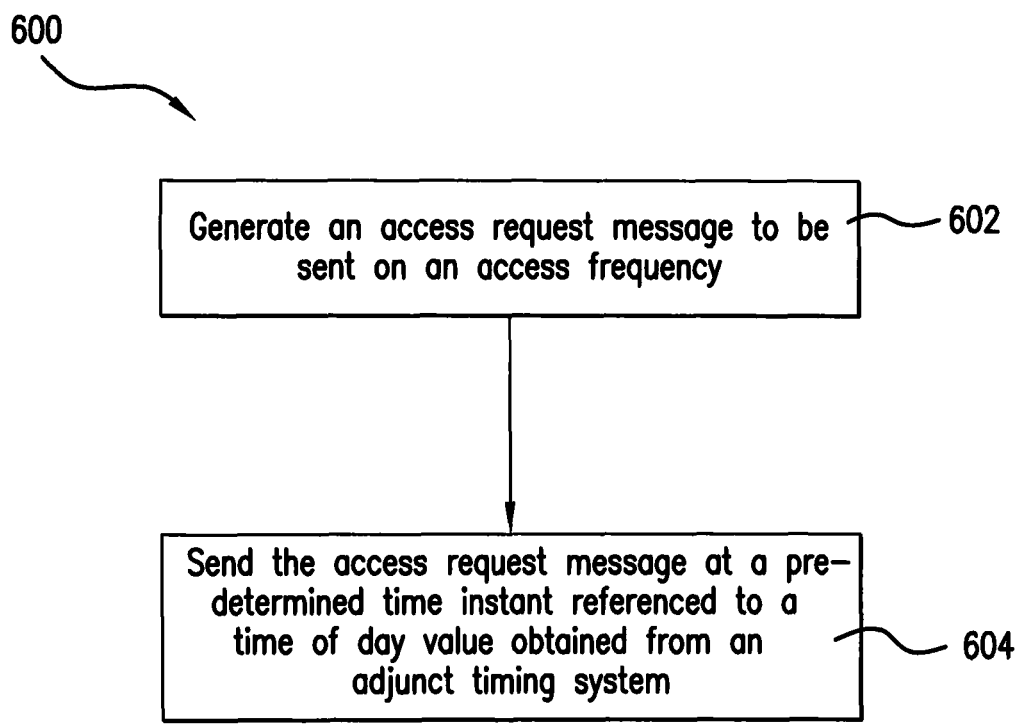
FIG. 6 is a flow chart illustrating a process according to some embodiments of the invention.

Referring now to FIG. 6, FIG. 6 is a flow chart illustrating a process 600, according to some embodiments, which is performed by mobile station 102. Process 600 may begin in step 602, where mobile station 102 generates an access request message to be sent on an access frequency. In step 604, mobile station 102 waits for the occurrence of a pre-determined time instant referenced to a time of day value obtained from an adjunct system and sends the access request message at the pre-determined time instant. For example, mobile station 102 may obtain a time of day value based one or more signals from the adjunct timing system and compare the time of day value to a pre-determined time value. In response to determining that the time of day value equals the pre-determined, mobile station 102 will transmit the access request message. In this manner, mobile station 102 is configured such that it sends access request message only at predetermined times.

Figure 7:
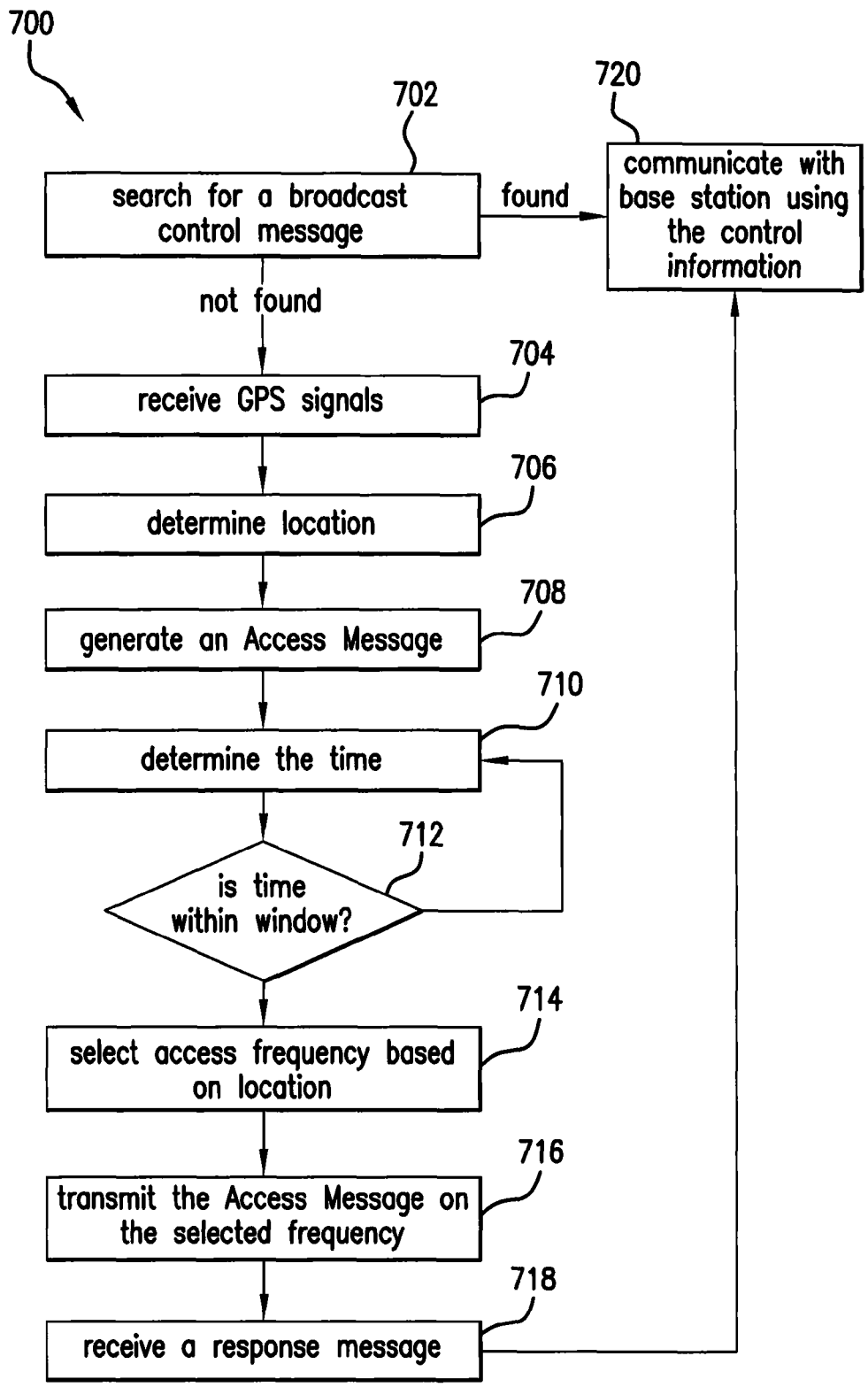
FIG. 7 is a flow chart illustrating a process according to some embodiments of the invention.

Referring now to FIG. 7, FIG. 7 is a flow chart illustrating a process 700, according to some embodiments, which is performed by mobile station 102. Process 700 may begin in step 702, where mobile station 102 searches for a broadcast signal containing control information. Preferably, mobile station 102 performs the search for a limited period of time (e.g., not more than 500 milliseconds). If the signal is found within the limited period of time spent searching, then process 700 proceeds to step 720, otherwise process proceeds to step 704. In step 704, mobile station 102 receives a signal from an adjunct timing system (e.g., the GPS). Using the received signal(s), mobile station 102 may determine its location (step 706). Next (step 708), mobile station 102 generates an access request message. Included in the access request message may be an identifier uniquely associated with mobile station 102 and information identifying the location of mobile station 102. Next (step 710), mobile station 102 determines the current time (e.g., the current time-of-day or the amount of time that has elapsed since a reference point in time (i.e., an epoch)). As described herein, mobile station 102 may determine the current time directly from an adjunct system alone or from information obtained from a local clock in combination with information from the adjunct system. In step 712, mobile station 102 determines whether the determined time falls within a predetermined window of time. If it does not, process 700 proceeds back to step 710, otherwise it proceeds to step 714.

In step 714, mobile station 102 selects an access frequency. As described above, the step of selecting an access frequency may include using the determined location information and a database to determine the access frequency associated with the determined location of mobile station 102. In step 716, mobile station 102 transmits the access request message on the selected access frequency so that the access request message may be received by any base station in the vicinity that is scanning the selected access frequency for access request messages.

In step 718, assuming at least one base station receives the access request message and transmits a response message in response to receiving the access request message, mobile station 102 receives the response message. In step 720, mobile station uses control information contained in the response message to further communicate with the base station that transmitted the response message. In this manner power can be saved because the base station need not continuously scan for access request message, but may, instead, be configured to scan for such messages only during certain windows of time (see e.g., FIG. 3).

Figure 8:
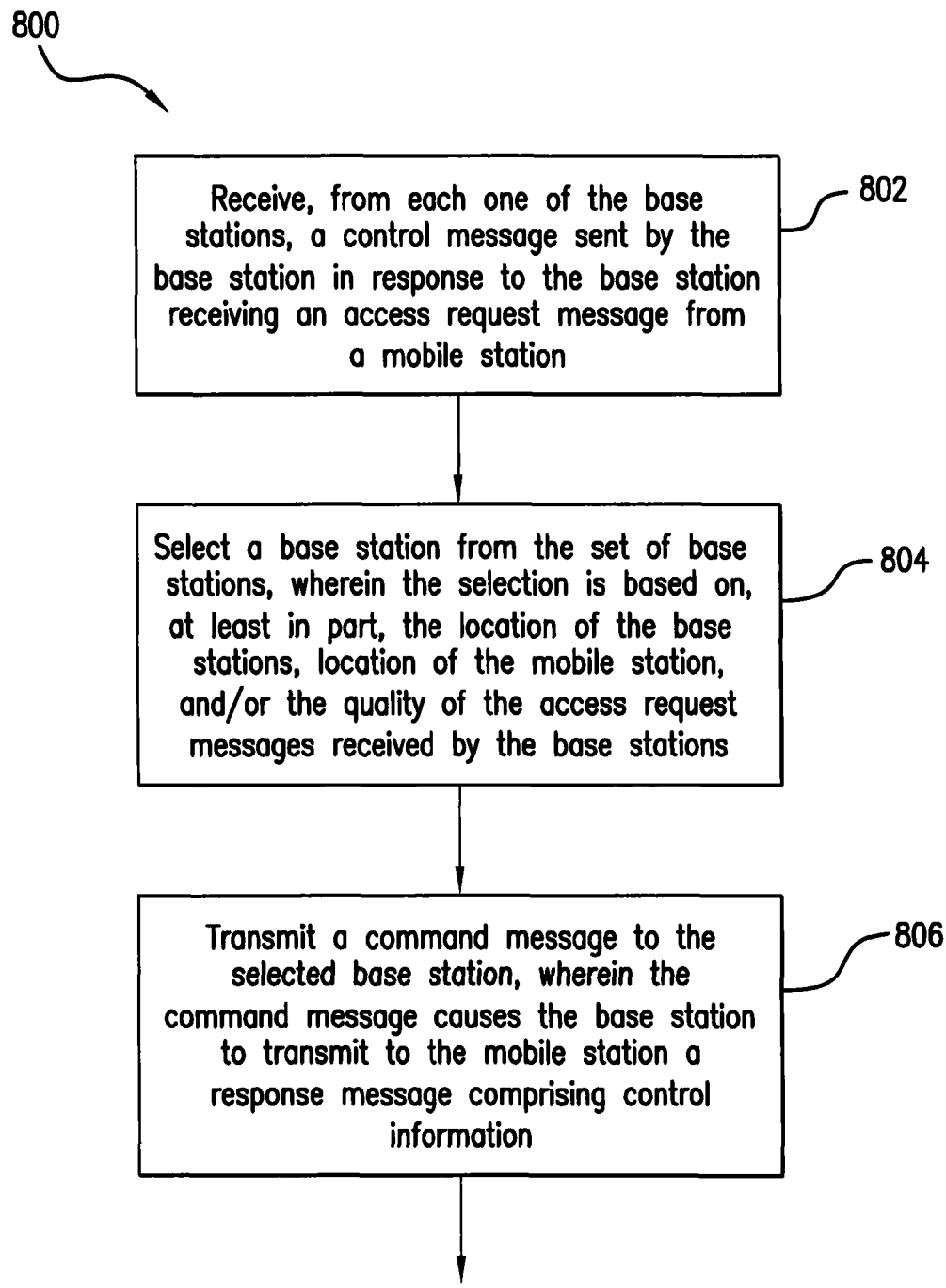
FIG. 8 is a flow chart illustrating a process according to some embodiments of the invention.

Referring now to FIG. 8, FIG. 8 is a flow chart illustrating a process 800, according to some embodiments, which is performed by RNC 106. Process 800 may begin in step 802, where RNC 106 receives, from each one of a set of base stations 104, a control message sent by the base station in response to the base station receiving an access request message from a mobile station. In step 804, RNC 106 selects a base station from the set of base stations, wherein the selection is based on, at least in part, the location of the base stations, the location of the mobile station, and/or the quality of the access request messages received by the base stations. In step 806, RNC 106 transmits a command message to the selected base station, wherein the command message causes the base station to transmit to the mobile station a response message comprising control information.

Figure 9:
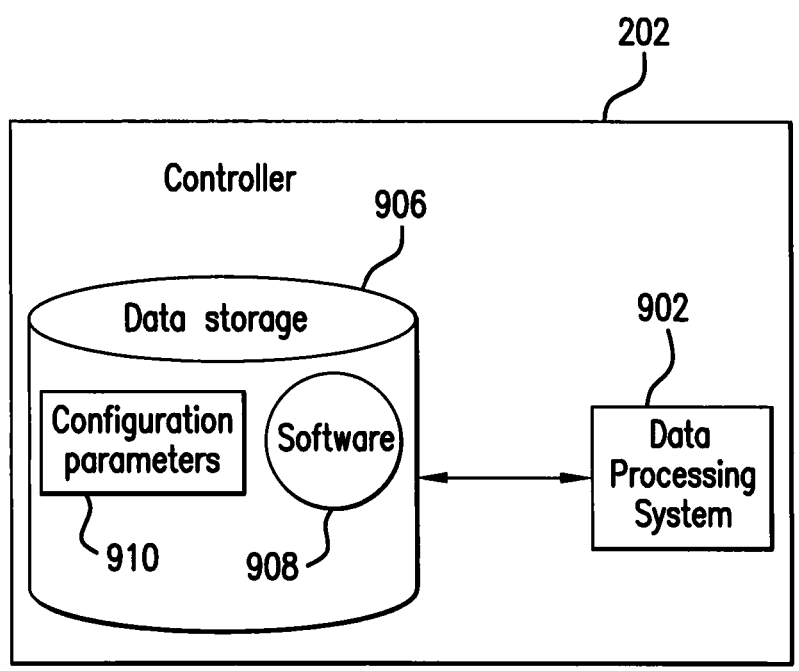
FIG. 9 is a functional block diagram of a base station controller according to some embodiments of the invention.

Referring now to FIG. 9, FIG. 9 is a functional block diagram of controller 202 according to some embodiments of the invention. As shown, controller 202 may comprise a data processing system 902 (e.g. one or more microprocessors, one or more integrated circuits, such as an application specific integrated circuit (ASIC), Field-programmable gate arrays (FPGAs), etc. and any combination of these), a data storage system 906 (e.g. one or more non-volatile storage devices) and computer software 908 stored on the storage system 906. Configuration parameters 910 may also be stored in storage system 906 (e.g., information identifying the times when receiver 208 should enter the sleep mode and search mode). In some embodiments, software 908 is configured such that when processing system 902 executes software 908, controller 202 performs steps described above (e.g., steps described above with reference to the flow chart shown in FIG. 5). In other embodiments, data processing system 902 is configured to perform steps described above without the need for software 908. That is, for example, data processing system may consist merely of one or more ASICs. Hence, the features of the present invention described above may be implemented in hardware and/or software.

Figure 10:
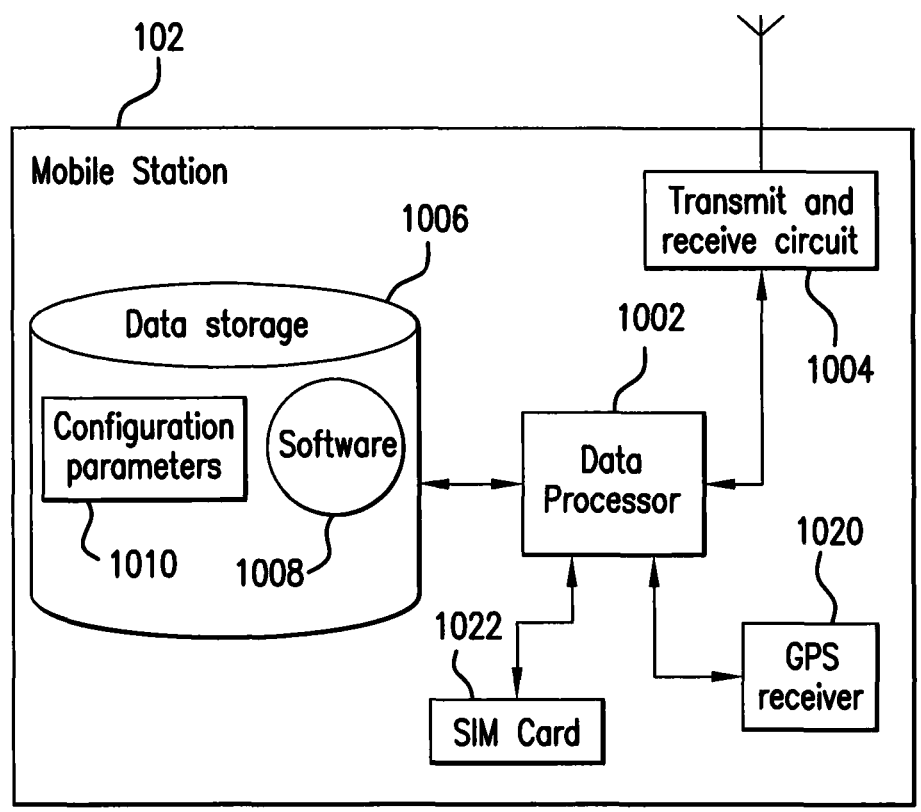
FIG. 10 is a functional block diagram of a mobile station according to some embodiments of the invention.

Referring now to FIG. 10, FIG. 10 is a functional block diagram of mobile station 102 according to some embodiments of the invention. As shown, mobile station 102 may comprise a data processing system 1002 (e.g. one or more microprocessors, one or more integrated circuits, such as an application specific integrated circuit (ASIC), Field-programmable gate arrays (FPGAs), etc. and any combination of these), a data storage system 1006 (e.g. one or more non-volatile storage devices) and computer software 1008 stored on the storage system 1006. Configuration parameters 1010 may also be stored in storage system 1006 (e.g., data specifying the access request message transmission time windows). Mobile station 102 may also include transmit/receive (Tx/Rx) circuitry 1004 for communicating with base stations 104 (e.g., circuitry 1004 may include a transmitter and/or a receiver), SIM card 1022, and GPS unit 1020. In some embodiments, software 1008 is configured such that when processing system 1002 executes software 1008, mobile station 102 performs steps described above (e.g., steps described above with reference to the flow chart shown in FIG. 7). In other embodiments, data processing system 1002 is configured to perform steps described above without the need for software 1008. That is, for example, data processing system 1002 may consist merely of one or more ASICs. Hence, the features of the present invention described above may be implemented in hardware and/or software.

Figure 11:
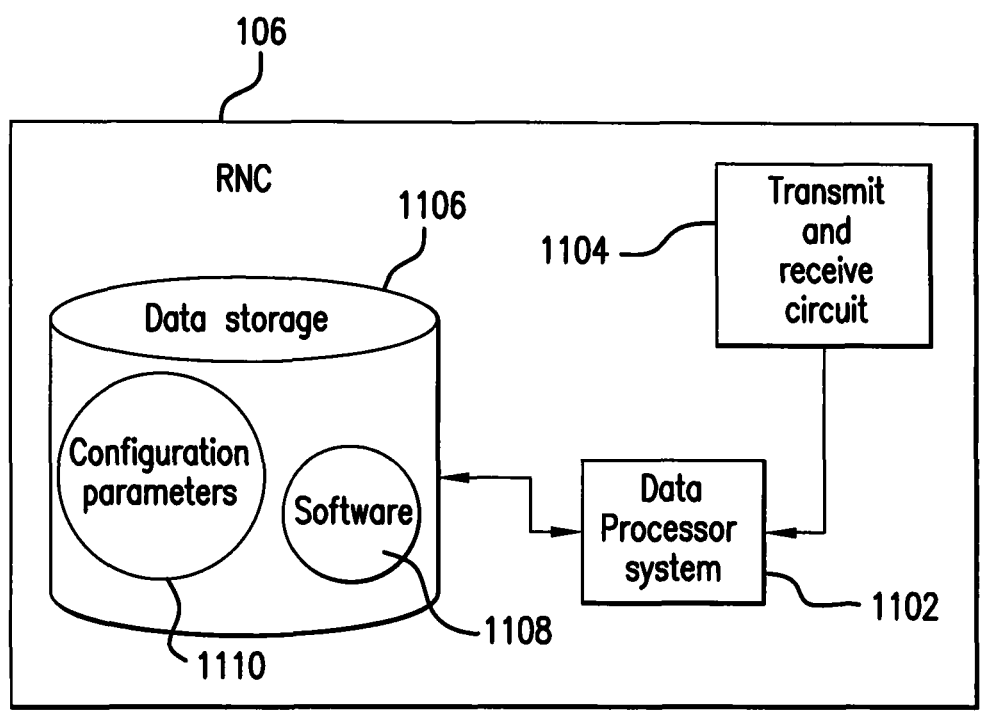
FIG. 11 is a functional block diagram of a network controller according to some embodiments of the invention.

Referring now to FIG. 11, FIG. 11 is a functional block diagram of RNC 106 according to some embodiments of the invention. As shown, RNC 106 may comprise a data processing system 1102 (e.g. one or more microprocessors, one or more integrated circuits, such as an application specific integrated circuit (ASIC), Field-programmable gate arrays (FPGAs), etc. and any combination of these), a data storage system 1106 (e.g. one or more non-volatile storage devices) and computer software 1108 stored on the storage system 1106. Configuration parameters 1110 may also be stored in storage system 1106 (e.g., information identifying the location of each one of a set of base stations 104). RNC 106 may also include transmit/receive (Tx/Rx) circuitry 1104 for communicating with base stations 104 (e.g., circuitry 1104 may include a transmitter and/or a receiver). In some embodiments, software 1108 is configured such that when processing system 1102 executes software 1108, RNC 106 performs steps described above (e.g., steps described above with reference to the flow chart shown in FIG. 8). In other embodiments, data processing system 1102 is configured to perform steps described above without the need for software 1108. That is, for example, data processing system may consist merely of one or more ASICs. Hence, the features of the present invention described above may be implemented in hardware and/or software.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. At a base station comprising a transmitter and a receiver, a method comprising:
   (a) configuring the transmitter such that it transmits control information on a discontinuous basis;
   (b) configuring the base station in a mode whereby the receiver is activated on a discontinuous basis;
   (c) when the receiver is activated, using the receiver to detect an access request message transmitted from a mobile station on an access frequency;
   (d) after detecting an access request message, determining the quality of the access request message;
   (e) determining whether the determined quality of the access request message exceeds a threshold; and
   (f) in response to determining that the quality exceeds the threshold, transmitting from the base station to the mobile station, a response message comprising control information, wherein the control information contains information that is needed by the mobile station to further communicate with the base station.

2. The method of claim 1, wherein activating the receiver on a discontinuous basis comprises activating the receiver at pre-determined time instants.

3. The method of claim 2, wherein the pre-determined time instants are referenced to a time of day value obtained by the base station from (i) an adjunct timing system or (ii) a local clock that is calibrated using a signal transmitted from an adjunct timing system.

4. The method of claim 1, further comprising, in response to detecting the access request message, transmitting, from the base station to the mobile station, a response message comprising control information, wherein the control information contains information that is needed by the mobile station to further communicate with the base station.

5. The method of claim 1, further comprising:
   determining a load on the base station;
   determining whether the determined load exceeds a threshold; and
   in response to determining that the load exceeds the threshold, changing the configuration of the transmitter such that the transmitter broadcasts said control information on a continuous basis.

6. The method of claim 1, further comprising:
   in response to detecting the access request message, determining the quality of the access request message;
   transmitting, from the base station to a radio network controller, a control message indicating the quality of the access request message;
   receiving from the radio network controller a command message sent in response to the control message; and
   in response to receiving the command message, transmitting from the base station to the mobile station, a response message comprising control information, wherein the control information contains information that is needed by the mobile station to further communicate with the base station.

7. The method of claim 1, wherein the access request message comprises a mobile station identifier associated with the mobile station.

8. The method of claim 1, wherein the access request message comprises information identifying the position of the mobile station.

9. The method of claim 1, wherein step (a) comprises configuring the transmitter such that it broadcasts said control information on a discontinuous basis.

10. The method of claim 1, wherein said control information comprises a pilot signal.

11. A method at a radio network controller (RNC) in communication with a set of base stations, the method comprising:
   receiving, from each one of a base stations, a control message sent by the base station in response to the base station receiving an access request message from a mobile station, wherein the receiver at the base station is activated on a discontinuous basis and wherein, for each control message, the control message comprises: information indicating the quality of the access request message received by the base station; and information indicating the position of the mobile station;
   selecting a base station from the set of base stations, wherein the selection is based on, at least in part, a location of the base stations, the location of the mobile station, and/or a quality of the access request messages received by the base stations; and
   transmitting a command message to the selected base station, wherein the command message causes the base station to transmit to the mobile station a response message comprising control information.

12. The method of claim 11, wherein, for each control message, the control message comprises information indicating the quality of the access request message received by the base station.

13. The method of claim 11, wherein, for each control message, the control message comprises information indicating the position of the mobile station.

14. A base station, comprising:
   a transmitter configured such that it transmits control information on a discontinuous basis;
   an access message receiver, wherein
   the base station is configured such that the access message receiver is activated on a discontinuous basis, and
   the access message receiver is operable to detect an access request message transmitted from a mobile station on an access frequency;
   further comprising a controller, wherein the controller is configured such that, in response to the access message receiver detecting the access request message, the controller (a) determines a quality of the access request message; (b) determines whether the determined quality of the access request message exceeds a threshold, and (c) in response to determining that the quality exceeds the threshold, causes the transmitter to transmit to the mobile station a response message comprising control information, wherein the control information contains information that is needed by the mobile station to further communicate with the base station.

15. The base station of claim 14, wherein the base station is configured such that the access message receiver is activated at pre-determined time instants and deactivated at other pre-determined time instants.

16. The base station of claim 15, further comprising:
a receiver for receiving signals from an adjunct timing system, wherein
the pre-determined time instants are referenced to a time of day value obtained by the base station from (i) the adjunct timing system, or (ii) a local clock that is calibrated using a signal transmitted from the adjunct timing system.

17. The base station of claim 14, further comprising a controller, wherein the controller is configured such that after the access message receiver detects the access request message, the controller causes the transmitter to transmit to the mobile station a response message comprising control information, wherein the control information contains information that is needed by the mobile station to further communicate with the base station.

18. The base station of claim 14, further comprising:
a controller for determining a load on the base station, wherein the controller is configured such that, in response to the controller determining that the load exceeds a threshold, the controller causes the transmitter to frequently broadcast the control information until the load on the base station falls below a threshold.

19. The base station of claim 14, further comprising a controller, wherein the controller is configured such that, in response to the access message receiver detecting the access request message, the controller (a) determines a quality of the access request message; (b) transmits to a radio network controller a control message indicating the quality of the access request message; (c) receives from the radio network controller a command message sent in response to the control message; and (d) in response to receiving the command message, cause the transmitter to transmit to the mobile station a response message comprising control information, wherein the control information contains information that is needed by the mobile station to further communicate with the base station.

20. The base station of claim 14, wherein the access request message comprises a mobile station identifier associated with the mobile station.

21. The base station of claim 14, wherein the access request message comprises information identifying the position of the mobile station.

22. A radio network controller (RNC), comprising:
a transmit and receive circuit operable to receive, from each one of a set of base stations, a control message sent by a base station in response to the base station receiving an access request message from a mobile station wherein a receiver in the base station is activated on a discontinuous basis; and wherein, for each control message, the control message comprises: information indicating the quality of the access request message received by the base station; and information indicating the position of the mobile station;
a data processing system configured to select a base station from the set of base stations in response to receiving the control messages, wherein the selection is based on, at least in part, a location of the base stations, the location of the mobile station, and/or the quality of the access request messages received by the base stations, wherein the data processing system is further configured to use the transmit and receive circuit to transmit a command message to the selected base station, wherein the command message is configured to cause the base station to transmit to the mobile station a response message comprising control information.

23. The RNC of claim 22, wherein, for each control message, the control message comprises information indicating the quality of the access request message received by the base station.

24. The RNC of claim 22, wherein, for each control message, the control message comprises information indicating the position of the mobile station.

* * * * *

UNITED STATES PATENT AND TRADEMARK OFFICE
CERTIFICATE OF CORRECTION

PATENT NO.        : 8,526,305 B2                                       Page 1 of 1
APPLICATION NO.   : 12/548045
DATED             : September 3, 2013
INVENTOR(S)       : Ramesh et al.

It is certified that error appears in the above-identified patent and that said Letters Patent is hereby corrected as shown below:

In the Drawings:

In Fig. 4, Sheet 4 of 11, for Tag "406", in Line 4, delete "a access" and insert -- an access --, therefor.

In the Specifications:

In Column 5, Line 8, delete "Fig. 3." and insert -- Fig. 3 --, therefor.

In Column 6, Lines 55-56, delete "base station 102," and insert -- base station 104, --, therefor.

In Column 7, Line 5, delete "(e.g," and insert -- (e.g., --, therefor.

In Column 8, Line 1, delete "(e.g," and insert -- (e.g., --, therefor.

In Column 9, Lines 53-54, delete "base station 102" and insert -- base station 104 --, therefor.

In Column 12, Line 24, delete "106." and insert -- 106). --, therefor.

Signed and Sealed this
Twenty-eighth Day of January, 2014

Michelle K. Lee
*Deputy Director of the United States Patent and Trademark Office*